Figures 1, 2, 3:
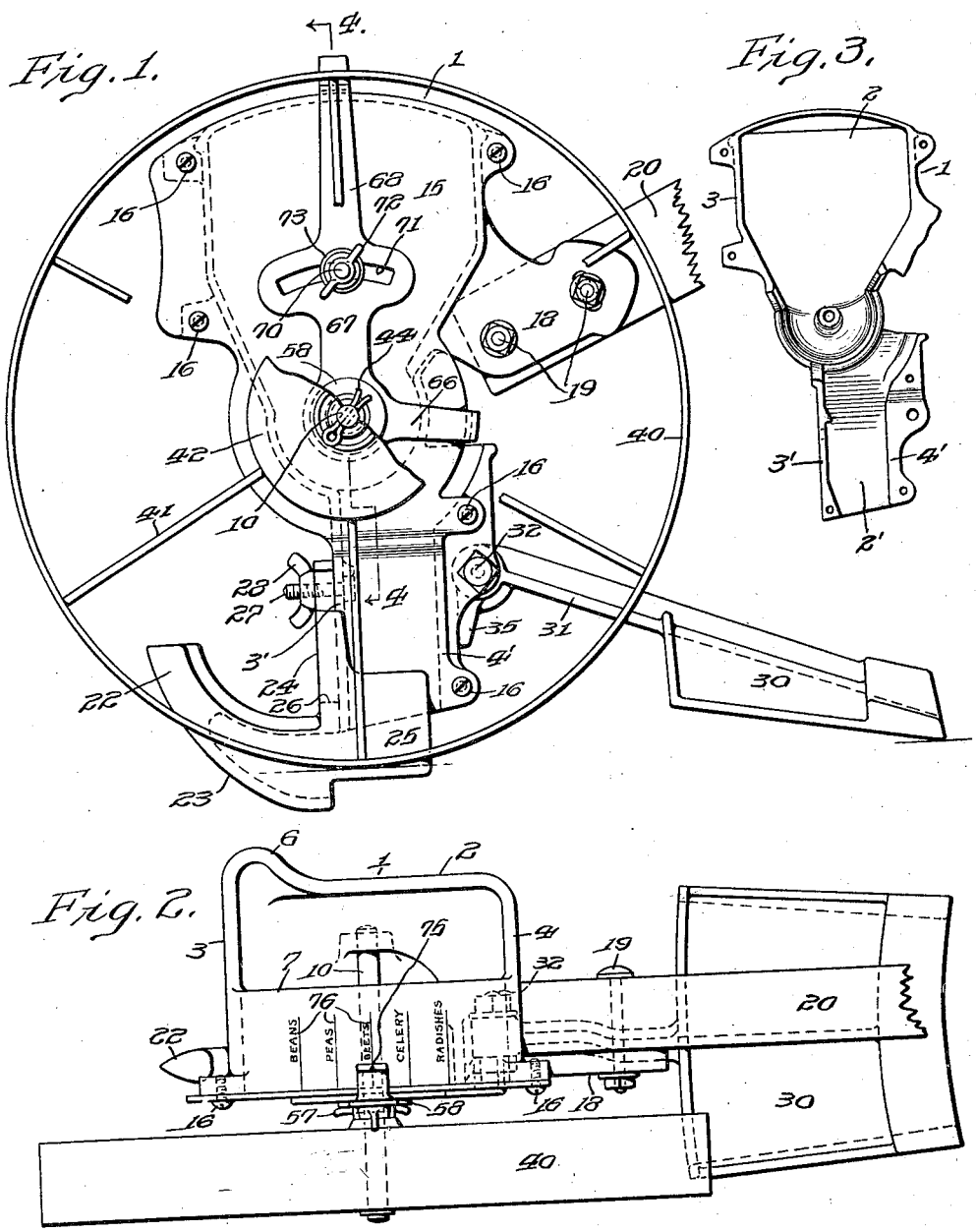

Nov. 13, 1923.

W. C. WARREN 1,474,184

SEED DRILL

Filed Jan. 30, 1922    2 Sheets-Sheet 1

INVENTOR
William C. Warren.
BY Blount, Moulton & Helket
ATTORNEYS

WITNESS
F.J. Hartman.

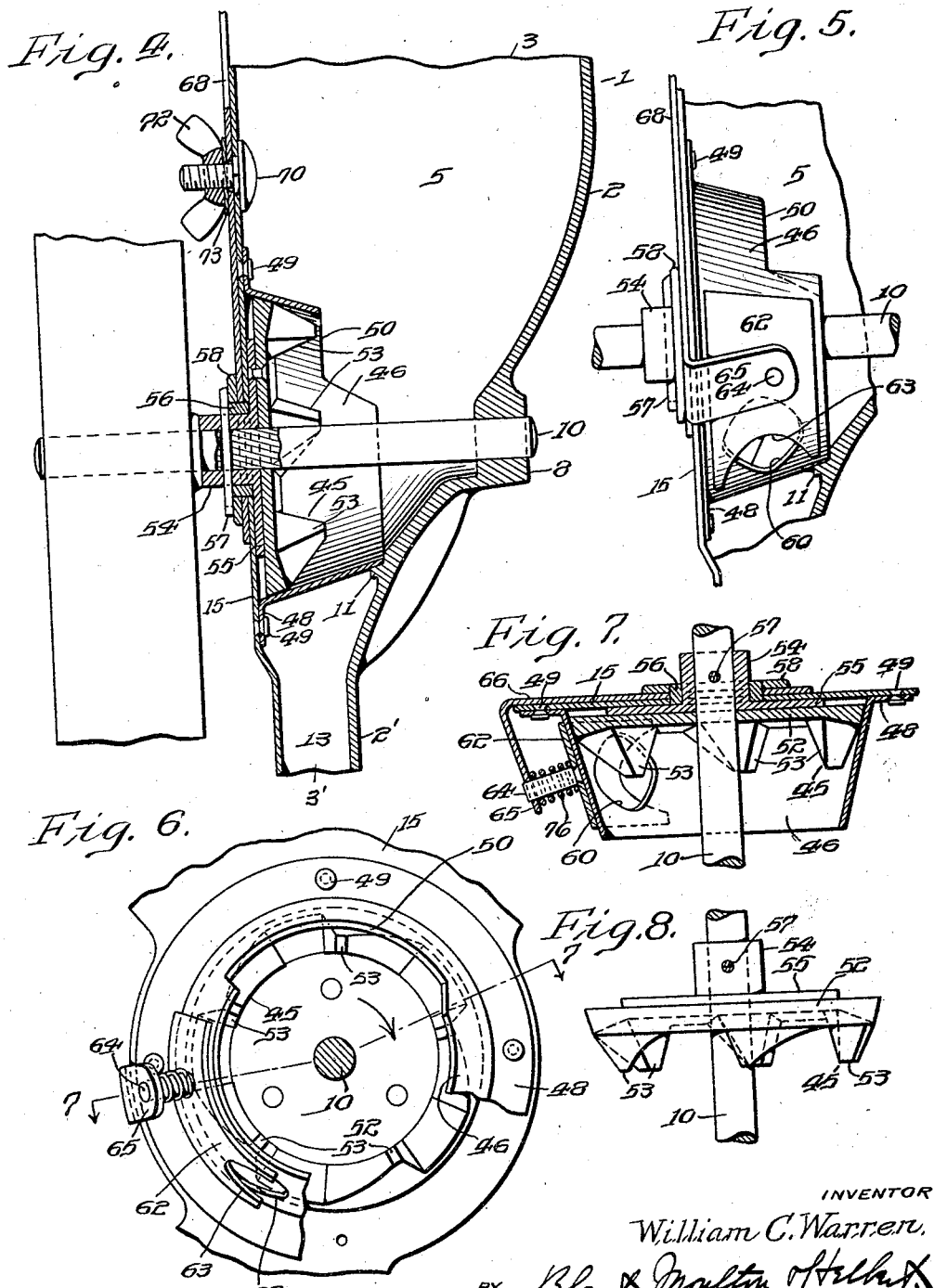

Patented Nov. 13, 1923.

1,474,184

UNITED STATES PATENT OFFICE.

WILLIAM C. WARREN, OF PHILADELPHIA, PENNSYLVANIA, ASSIGNOR TO S. L. ALLEN & CO., INC., A CORPORATION OF PENNSYLVANIA.

SEED DRILL.

Application filed January 30, 1922. Serial No. 532,570.

*To all whom it may concern:*

Be it known that I, WILLIAM C. WARREN, a citizen of the United States, and a resident of the city and county of Philadelphia, in the State of Pennsylvania, have invented certain new and useful Improvements in Seed Drills, of which the following is a specification, reference being had to the accompanying drawings.

The present invention relates to implements utilized for sowing seed in rows and which are commonly known as seed drills. Hitherto in implements of this class it has been customary to provide a hopper communicating with a chamber in which a rotatable member is disposed for the purpose of agitating the seed and carrying it to a position from which it may fall through an opening in the wall of the chamber and thence through a suitable spout to the furrow in the ground. It has, however, been found in seed drills of this general construction and in which the chamber is of cylindrical form with the agitating member rotatable about the axis thereof, that difficulty is experienced by reason of the lodging of seeds between the edge of the opening and the agitator blades which tends to crush and injure the seeds, while, additionally, when the major portion of the seed has been exhausted from the hopper, the flow of the seed through the opening becomes irregular so that it is deposited in the furrow in a more or less uneven manner. Moreover, owing to the shape and arrangement of the parts it is very difficult to entirely exhaust the seed from the chamber, a small quantity generally remaining therein in such position that it is not swept through the opening by the agitator, and is thus wasted unless removed from the chamber by hand.

A principal object of my invention is to provide a seed drill which may, if desired, also be utilized for the distribution of fertilizer or the like, which is of extremely simple and compact design and which is not open to the objections to which reference has been made; which shall embody means for readily varying the size of the opening through which the seed is ejected so as to adapt the implement for use with different sizes and kinds of seeds; which shall embody a seed distributing chamber of novel design in association with an agitating member of peculiar construction and operative to continuously agitate the seed in the chamber while the machine is in use, and to sweep the seed to the opening in the chamber wall in such manner as to prevent the jamming of the seed between the agitator blade or teeth and the wall of the discharge opening.

My invention further comprehends the general simplification of the various elements of seed drills so as to reduce the cost of manufacture and minimize the liability of becoming damaged or inoperative under hard usage, as well as the production of an implement of attractive design and appearance which may be operated for the purpose intended and which is effective to secure an even distribution of the seed in the furrow irrespective of the amount of seed contained in the hopper or agitating chamber.

My invention further includes all of the other various objects and novel features of construction and arrangement shown in the accompanying drawing or hereinafter more particularly referred to or described.

In the said drawing in which I have shown a preferred form of my invention, the particular type of implement illustrated is one more especially adapted for the distribution of seeds in truck-gardening or similar work, but it will be understood the use of the invention is in no way limited to any particular style or character of seed drill as the same may be embodied in other types of implements than that illustrated and which may be more suitable for other kinds of agricultural operations.

In said drawing Fig. 1 is a side elevation, with certain parts broken away for the sake of clearness, of the form of my invention now to be described and Fig. 2 is a top plan view thereof. Fig. 3 is a side elevation on a reduced scale of the body of the drill; Fig. 4 is a vertical fragmentary enlarged section on the line 4—4 in Fig. 1; Fig. 5 is a fragmentary elevation on the same scale showing the element forming the agitating chamber together with certain adjacent parts; Fig. 6 is an end elevation thereof; Fig. 7 is a section on line 7—7 in Fig. 6, and Fig. 8 is a side elevation of the agitator removed from the machine. Like numerals are used to designate similar parts in the several figures.

As shown, the seed drill comprises a body 1 substantially rectangular in planary outline adjacent its upper edge and having a side wall 2, front wall 3 and rear wall 4, these several walls bounding a hopper 5 for the reception of the seed. Preferably the several walls are arranged to converge downwardly as shown in Figs. 1 and 3 and if desired the side wall adjacent its upper edge may be formed to provide a lip 6 to assist in the convenient introduction of the seed. Preferably the top of the body is left open adjacent the side wall and covered on the opposite side by a cover plate 7 formed integrally with the end walls.

The side wall is provided with a boss 8 forming a bearing for the drive shaft 10 hereinafter referred to and a short distance below the boss is arranged to terminate in an inwardly directed circular shoulder or ledge 11 with which one end of the element forming the agitator chamber and hereinafter described, is adapted to operatively engage. The end walls 2 and 3 of the hopper terminate a little above the center line of the boss as best shown in Fig. 3, and for the purpose of conducting the seeds to the furrow a discharge chute is formed below and rearwardly offset from the flange or shoulder 11, conveniently by extending downwardly therefrom an integral wall 2' which is in effect an extension of the hopper wall 2 and at the edges of which are end walls or flanges 3', 4', the latter adjacent its upper extremity being rearwardly flared so as to provide room when the machine is assembled for the reception of the conical element forming the agitator chamber.

It will be observed that the side of the casting forming the body is entirely open opposite the walls 2, 2', this opening being closed in the assembled machine by a cover plate 15 conveniently formed of sheet metal and so shaped as to rest against the open side of the casting to which it is secured by suitable screws 16 positioned at convenient points, the casting being provided with suitable lugs or flanges for the reception of the screws. Thus when assembled the plate is rigidly secured to the casting. The latter is also provided with a rearwardly and upwardly directed lug 18 to which may be secured by bolts 19 a suitable rearwardly and upwardly extending handle 20 by means of which the implement is guided and propelled by the operator.

For the purpose of opening a suitable furrow to receive the seed as it falls from the discharge chute the implement may be provided with a preferably vertically adjustable plow 22 comprising a V-shaped upwardly and forwardly curved blade 23. Adjacent the rear end of the blade a support 24 is arranged to extend vertically upward and from the side edges of this support laterally spaced wings 25 (only one of which is shown) are extended rearwardly so as to receive between them the lower extremity of the discharge chute. Conveniently the support 24 is provided with a central vertical slot 26 through which extends a bolt 27 carried by the front wall 3' of the chute and upon the projecting end of which is disposed a wing nut 28 which bears against the support and by means of which the plow may be secured in any desired vertically adjusted position within the limits of movement permitted by the length of the slot 26.

For the purpose of covering up the furrow opened by the plow as the implement is propelled over the ground the latter is provided with a vertically movable covering blade 30 having a forwardly extending arm 31 the end of which is pivoted on a horizontally positioned pivot bolt 32 disposed in a suitable lug formed on the body in the rear of the wall 2' in such manner that the blade is free to move in a vertical plane. Preferably the blade is substantially square in planary outline with its under face curved upwardly and inwardly in opposite directions from its side edges so that as it is drawn forwardly over the ground it tends to throw or scrape the earth inwardly from both sides of the furrow, thus thoroughly covering the seed deposited therein. To prevent the covering blade from swinging downwardly to a vertical position when the implement is lifted from the ground, the arm 31 may be provided with an integral stop member 35 arranged to engage the wall 2' and thus limit the possible downward movement of the blade.

The implement is operatively supported by a ground wheel 40 of any suitable construction having spokes 41 terminating in a hub 42 and secured to one end of the shaft 10 extended outwardly beyond the cover plate, the connection between the hub and the shaft being conveniently made by a cotter pin 44 passing through a flange on the hub and through the shaft so that the shaft and wheel rotate together. This shaft is also operative to effect the rotation of the agitator 45 which is disposed within an agitator casing 46 located within the hopper and now to be described.

This casing is conveniently formed of sheet metal in the shape of a truncated cone, the angle of inclination of the wall being preferably about 15° with the axis of the cone although a greater or less angle of inclination may be employed in certain constructions. The base of the casing is conveniently provided with an outwardly directed flange 48 which is secured, as by rivets 49, to the inner face of the cover plate in such manner that the axis of the cone shaped casing will coincide with that of the shaft 10 and the opposite extremity of the casing will rest in the shoulder or ledge 11 adjacent the lower extremity of the inner face of the wall 2, thereby insuring both a rigid support for the casing and a tight fit between the parts at this point and preventing any seed from sliding down between the wall and the end of the casing into the discharge chute. It will be understood that the interior of the hopper adjacent the small end of the casing is so shaped that the seed will tend to slide down the walls of the hopper and be directed into the casing, and additionally, that the upper part of the casing adjacent the small end thereof is cut away as at 50 for a portion of its length as best shown in Fig. 5 so as to enlarge the opening through which the seed may pass from the hopper into the casing. It will be further understood that the interior of the hopper adjacent the small end of the casing is so shaped and the ledge or shoulder 11 so disposed that the end of the casing below the cut away portion will snugly abut against the wall of the hopper.

Rotatably mounted within the agitator casing is the agitator 45 which is of peculiar construction and comprises a preferably circular base 52 and a plurality of teeth 53 disposed at spaced intervals about the periphery thereof. The base which is of a diameter to form a free working fit within the large end of the agitator chamber, is provided with a central aperture for the passage of the shaft 10 and is conveniently mounted on a sleeve 54 provided at one end with an outwardly extending flange 55 which is riveted or otherwise fixedly secured to that face of the base opposite to that from which the teeth project. The sleeve is arranged to extend through a suitable aperture in the plate 15 which is provided with a bushing 56 rigidly secured in the aperture and projecting outwardly beyond the face of the plate and is operatively secured in fixed relation with the shaft 10 which extends therethrough in any suitable manner, conveniently by means of a cotter pin 57 extending through the sleeve and the shaft, a washer 58 preferably positioned over the projecting end of the bushing 56 serving to prevent longitudinal play of the shaft.

The teeth 53 are each of substantially truncated irregular pyramidal form, the angle of inclination of the outer face of each tooth being preferably slightly greater than that of the wall of the agitator chamber, while that side of each tooth which, when the agitator is rotated in the direction of the arrow in Fig. 6, forms the leading face of the tooth, is preferably inclined at an angle of about 45°, whereas the opposite face is but slightly inclined from the vertical. Additionally, the surface of the forward or more greatly inclined face of the tooth is preferably not entirely plane but substantially slightly helical in contour with respect to the axis of rotation of the agitator, to the end that as the latter is rotated in the direction of the arrow, the teeth will impart a sort of sweeping motion to the seed lying on the bottom of the agitator chamber so as to continually brush or sweep the same up the inclined wall of the chamber in a direction away from the base of the agitator. While in the drawing the agitator is shown as comprising five teeth, a greater or less number may be employed if desired, the height of the teeth measured parallel to the shaft 10 being preferably about one-half the length of the agitator chamber wall.

For the purpose of permitting the seed to pass from the agitator chamber, the wall of the latter is provided with a preferably substantially elliptical discharge opening 60 disposed in the rear of a vertical plane passing through the axis of the shaft 10, in which position the opening will be in substantial alignment with the chute 13. It will be observed that the width of this opening, that is, the smaller diameter of the ellipse, is preferably such that the ends of the teeth will be in substantial alignment with the major axis of the ellipse, so that when the agitator is rotated, the teeth will consecutively pass approximately over that half of the opening lying adjacent the larger end of the agitator chamber.

Means are also provided for regulating the size of the opening in accordance with the particular sort of seed which is to be employed, said means preferably comprising a curved plate 62 adapted to engage the exterior of the wall of the agitator chamber in the vicinity of the opening 60, the lower end of this plate being curved as at 63 in substantial conformity with the edge of the opening. Rigidly secured to the plate is an outwardly projecting stud 64, the end of which is extended loosely through an aperture formed in the inwardly turned end 65 of one arm 66 of a member 67 having another arm 68 extending upwardly to terminate above the cover plate 6 and thus substantially forming a bell crank lever. This member is preferably of sheet metal and is pivoted for rotation on the projecting end of the bushing 56 between the washer 58 and the outer face of the cover plate. For securing the arm 68 in any desired position, a bolt 70 having a squared shank is passed outwardly through the cover plate and through a curved slot 71 formed in the arm 68 which is widened in the vicinity of the slot, and a wing nut 72 is threaded onto the projecting end of the bolt, a washer 73 being preferably disposed between the nut and the face of the arm. Thus by loosening the nut the arm may be swung about its pivotal point through an arc limited by the length of the slot 71 so as to move the plate 62 circumferentially about the agitating chamber, the parts being so arranged that when the arm is at one end of its throw the plate will be entirely clear of the opening 60 and when at the other, will overlap the opening sufficiently to close or nearly close it. Thus by suitable movement of the arm the size of the opening may be regulated to a nicety in correspondence with the size of the particular seed which is to be sown, and to assist in properly setting the arm the upper end of the latter may be provided with a pointer or notch 75 cooperative with an index 76 marked on the surface of the cover plate and showing the proper position of the arm for various sorts of seeds. In order that the plate may at all times closely hug the outer surface of the wall of the agitator chamber a small spring 76 is preferably disposed on the stud 64 between the plate and the lug 65 in such manner that the plate will be yieldingly forced against the wall but without in any way interfering with its movement thereabout in correspondence with the movement of the arm.

In the operation of a seed drill constructed in accordance with my invention, the plow 22 may be set to open a furrow of the desired depth when the implement is pushed over the ground and the arm 68, through the medium of the index, brought to and then clamped in the proper position to suitably regulate the size of the aperture 60 for the particular kind of seed which is to be sown. The seed is then introduced into the hopper and the machine propelled forwardly by the handle 20, thus causing the rotation of the ground wheel 40 and corresponding rotation of the agitator within the agitator chamber. As a seed sifts downwardly into the latter from the hopper the rotation of the agitator continuously sweeps it up the inclined wall of the chamber and toward the discharge opening 60, through which it falls into the chute and thence to the furrow which is thereafter closed through the action of the covering plate 30. It is found in practice that through the cooperation of the peculiarly shaped agitator teeth with the inclined wall of the agitator chamber, the seed is swept or brushed through the discharge opening with entire regularity irrespective of the quantity of seed in the hopper, and further, that there is substantially no jamming of the seed grains between the agitator teeth and the edge of the discharge opening which in the types of drills hitherto employed is a matter of frequent occurrence, resulting either in damage to the machine.

While I have herein described and shown in the accompanying drawings with considerable particularity a preferred embodiment of my invention, I do not thereby desire or intend to in any manner limit myself to any precise details of construction or arrangement of the various elements, nor to the employment of the invention in drills of any particular character or type, as suitable modifications may be made in the precise form and disposition of the several parts and the invention employed in different sorts of implements adapted for sowing seed or for distributing fertilizer without departing from the spirit and scope of the invention as defined in the appended claims.

Having thus described my invention, I claim and desire to protect by Letters Patent of the United States:

1. In an implement of the class described, the combination of a hopper, an agitator casing having inclined walls disposed within the hopper and closed at its larger end, a rotatable agitator within the hopper and having spaced teeth cooperative with but spaced from the wall of the casing to sweep seed toward the small end thereof when the agitator is rotated, and means for rotating the agitator when the implement is propelled over the ground.

2. In an implement of the class described, the combination with a hopper, of a rotatable agitator disposed within the hopper and comprising a base and a plurality of substantially pyramidal teeth spaced about its periphery, a casing substantially in the form of a truncated cone disposed within the hopper about but spaced from said agitator and extending into the hopper beyond the agitator teeth, said casing having its small end opening directly into the hopper and its wall provided with a discharge opening, and means for rotating the agitator when the implement is propelled over the ground.

3. In an implement of the class described, the combination with a hopper, of an agitator casing having a discharge opening in its wall and forming a substantially conical agitator chamber communicating with said hopper through its smaller end, a shaft extending horizontally through said casing, an agitator mounted on said shaft and rotatable therewith, said agitator comprising a base adjacent the large end of the casing and a plurality of substantially pyramidal teeth spaced about the periphery of the base and extending toward but terminating short of the small end of the casing, and means for effecting the rotation of the shaft when the implement is propelled over the ground whereby said teeth are operative to sweep the seed in said casing in a direction away from the base of the agitator and across said opening 4. An implement of the class described comprising a unitary hopper and discharge chute, said hopper and chute being open at one side, a cover plate adapted to close said open side, an agitator casing mounted on said plate, having an inclined wall and communicating with said hopper, said wall being provided with an opening aligned with said chute, an agitator mounted on a shaft within the casing and having a plurality of spaced teeth cooperative with the wall of the casing, means for rotating said shaft when the implement is propelled over the ground, and means for controlling the size of the discharge opening.

5. An implement of the class described, comprising a unitary hopper and discharge chute open at one side, a cover plate adapted to close said open side, an agitator casing carried by said plate, communicating with the hopper and provided with a discharge opening aligned with said chute, an agitator comprising a plurality of spaced teeth disposed within the casing, a shaft extending through said casing and adapted to rotate said agitator, means for effecting the rotation of said shaft when said implement is propelled over the ground, and adjustable means comprising a spring pressed plate cooperative with the exterior of said casing operative to regulate the size of said discharge opening in conformity with different sizes of seed.

In witness whereof, I have hereunto set my hand this 26th day of January, 1922.

WILLIAM C. WARREN.